July 19, 1966 C. H. KRAMP 3,261,728

METHOD OF ALLOYING ELECTRODES TO A SEMICONDUCTOR BODY

Filed May 23, 1962 4 Sheets-Sheet 1

INVENTOR
CARL H. KRAMP
BY
AGENT

INVENTOR
CARL H. KRAMP
BY
AGENT

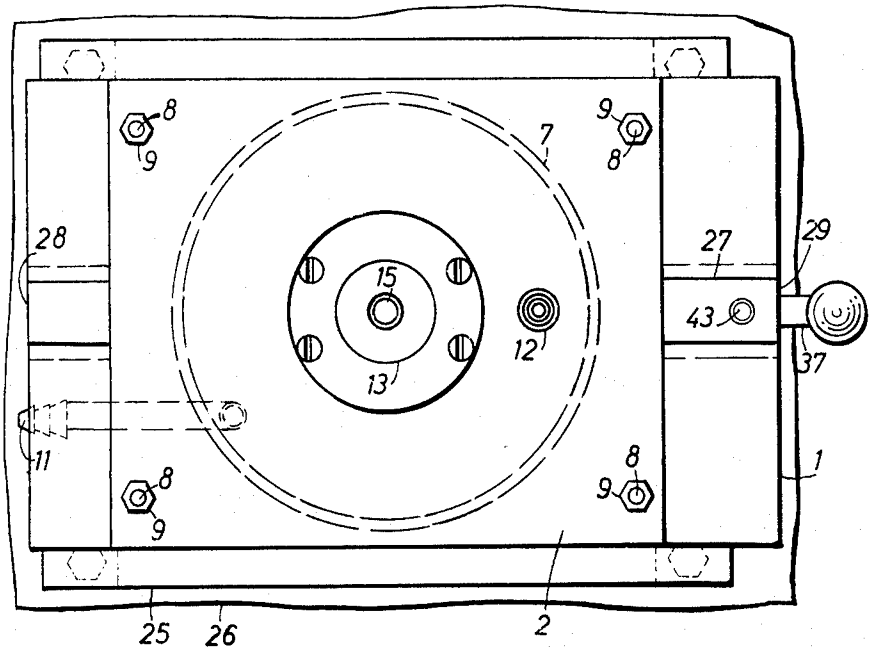
Fig. 4
Fig. 5 Fig. 6
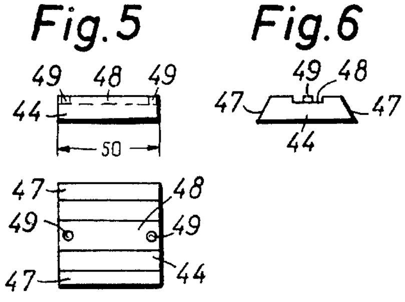
Fig. 7
INVENTOR
CARL H. KRAMP
BY
AGENT

METHOD OF ALLOYING ELECTRODES TO A SEMICONDUCTOR BODY

Filed May 23, 1962 4 Sheets-Sheet 4

INVENTOR
CARL H. KRAMP

BY Frank R. Jifoni
AGENT

United States Patent Office 3,261,728
Patented July 19, 1966

3,261,728

METHOD OF ALLOYING ELECTRODES TO A SEMICONDUCTOR BODY

Carl Heinrich Kramp, Hamburg-Niendorf, Germany, assignor to North American Philips Company, Inc., New York, N.Y., a corporation of Delaware Filed May 23, 1962, Ser. No. 196,982
Claims priority, application Germany, May 25, 1961, P 27,216
6 Claims. (Cl. 148—177)

The invention relates to a method of alloying electrodes to a semiconductor body while using an alloying jig, the heat capacity of which is large with respect to the heat capacity of the semiconductor body.

In the manufacture of electrodes on semiconductor bodies it is known to use an alloying method. Usually the electrode material, mostly in the form of pellets, for example of approximately 0.1 to 1 mm. diameter, is laid in a template on a disc or wafer of semiconductor material provided in an alloying jig, so that the pellet and the semiconductor body are in contact with one another. The object of the template is to prevent a lateral movement of the pellets or the differently shaped electrode material.

The assembly is then subjected in a furnace under a protective gas to such a high temperature that the pellets alloy into the semiconductor body. An example of a semiconductor body that is used is a germanium or silicon disc of a few square millimeters surface and a thickness in the order of magnitude of 100 microns. Germanium and silicon in the form of strips is also used, to which a plurality of electrodes can be alloyed simultaneously. After the alloying process, the strips are broken into pieces, each piece constituting the starting material for a semiconductor device to be manufactured. As is known, the pellets for forming the electrodes may consist of metals or alloys of various compositions in accordance with the object of the finished semiconductor devices.

The heat capacity of the alloying jig is large in comparison with the semiconductor body and the electrode material provided to it. Due to this large heat capacity heating and cooling times are rather long, such that the heat treatment will take a rather long time, which will be at least some minutes. This is a handicap in mass production, specially when the process is carried out mechanically. Moreover during the rather long heat treatment contaminations from the environment may enter into the semiconductor body or the electrode.

It is an object of the invention to enable the alloying process to be carried out in a rather short time.

According to a first aspect of the invention, in a method of alloying one or more electrodes onto a semiconductor body while using an alloying jig, the heat capacity of which is large with respect to the heat capacity of the semiconductor body, the semiconductor body and the electrode material to be alloyed onto said body are applied to an alloying jig which is preheated to at least the alloying temperature. Due to the relatively large heat capacity of the alloying jig the semiconductor body and the electrode material are heated in a short time, such that the electrode material is melted and, as the case may be, the final alloying process may be carried out in a much shorter time interval than in known processes, generally within one minute, for instance in a few seconds. The alloying jig may be preheated at the alloying temperature desired as the heat loss due to raising the temperature of the semiconductor body and the electrode material to the desired temperature will be so small that it will not substantially lower the temperature of the alloying jig. In order to further accelerate the alloying process the alloying jig may be preheated to a higher temperature and the semiconductor body and the electrode material may be kept in the jig only during such a short time interval that the molten electrode material may not be heated to above the desired alloying temperature.

The alloying jig may be preheated to above the desired alloying temperature in a furnace, subsequently the jig may be removed from the furnace, and the semiconductor body and the electrode material may be applied to the jig before the latter has been cooled down. The alloying jig may, however, also be heated continually during the alloying process, for instance at a constant temperature.

Preferably the semiconductor body is applied to the preheated alloying jig first, after which the electrode material is provided onto the semiconductor body and alloyed thereto, subsequently to which the semiconductor body and the electrode material alloyed thereto are removed from the jig.

According to a further preferred embodiment of the method according to the invention the electrode material is pressed onto the semiconductor body during the alloying process.

In this respect it is noted that it is known as such, that many electrode materials, including some of the most favorable ones, in the liquid state poorly wet the semiconductor body. As a result of this, electrodes may alloy very unevenly, which results in a corresponding high reject rate of defective semiconductor devices in the manufacture. This difficulty becomes particularly disturbing in electrodes having a large surface such as are used for power diodes or for many power transistors.

A method is known for providing the electrode material on the semiconductor body, in which a disc is punched out of a foil of the electrode material and rigidly pressed on a cold semiconductor body so that it adheres to it. The drawback of this method is that not every electrode material sufficiently rigidly rests on the semiconductor body, so that the method may be used only for some compositions of electrode material. In order to obtain a ready adherence, the electrode material must be provided on the semiconductor body with a large pressure so that the use of the method is possible only when using comparatively thick semiconductor bodies, since thin semiconductor bodies may collapse under the pressure.

It has also been tried to remove the undesired effects of the poor wetting by forcing the semiconductor body against the electrode material by weights or spring pressure. Since the pellets of electrode material have to be adjusted carefully with respect to one another and the semiconductor body, the use of these forces requires a complicated construction of the alloying jigs containing the electrode material and the semiconductor body, so that these jigs are quite large and consequently their heat capacities are very large. It is further cumbersome to fill these jigs.

The method according to the invention enables the electrode material to be alloyed onto the semiconductor body with the use of compression without substantially increasing the duration of such an operation.

The temperature of the alloying jig may be chosen so that after melting the electrode material on the semiconductor body further alloying of the electrode material onto the semiconductor body may be carried out in order to achieve the desired penetration depth of the molten electrode material into the semiconductor body. In addition an impurity contained in the electrode material may diffuse into the semiconductor material adjacent to the melt.

Preferably the semiconductor body is attached to the alloying jig by suction.

The invention also relates to apparatus suitable for mechanically carrying out the method according to the first aspect of the invention. According to a second aspect of the invention this apparatus is provided with a number of carriers moveable in a track for supplying semiconductor bodies and electrode material, in which in the track to be passed through by the carriers at least one station, further referred to as "alloying station," is present, in which an alloying jig being moveable with respect to the carrier is provided and heating means are present for heating the alloying jig. Preferably, the carriers are stepwise moveable along the track, the alloying jig being moveable with respect to the carrier at the alloying station during a period of standstill of the carriers in the track.

According to a preferred embodiment of the apparatus the alloying jig is provided above the track of the carriers and contains one or more channels, the device being provided with such-means to provide for sub-pressure inside the channels for lifting one or more semiconductor bodies from a carrier and attaching them to the jig by suction.

According to a further preferred embodiment of the apparatus, means are provided for transporting a carrier at the alloying station from the track to the alloying jig. In the case that the alloying jig is provided above the track the transport means comprises a vertically moveable stamp for lifting a carrier from beneath out of the track to the jig, the stamp and the carriers being proportioned such that the stamp may lift just one carrier at a time out of the track.

According to a further preferred embodiment of the apparatus, the alloying jig is provided inside a container, the track being passed through said container, means being provided to apply and maintain a protecting gas atmosphere in the inside of said container. Preferably the container is provided with passages through which the carriers are supplied and carried off, the passages being substantially sealed by the carriers passing through them.

For suitably carrying out the method according to the first aspect of the invention with the aid of apparatus according to the second aspect of the invention preferably the carriers to be transported one after the other to the alloying station are provided in turn with one or more semiconductor bodies and with the electrode material, the semiconductor body or bodies being transferred at the alloying station from a first carrier to the continuously heated alloying jig, subsequently to which electrode material provided to a second carrier, is applied to the semiconductor body or bodies and alloyed thereto, the semiconductor body or bodies with the electrode material alloyed thereto being subsequently removed from the jig and transported from the alloying station by the said second carrier.

In order that the invention may readily be carried into effect, one possible embodiment of apparatus for performing the method according to the invention will now be described more fully, by way of example, with reference to the accompanying drawings, with reference to which the method also will be explained.

FIG. 4 is a plan view of the apparatus shown in FIG. 1.

Figure 2:
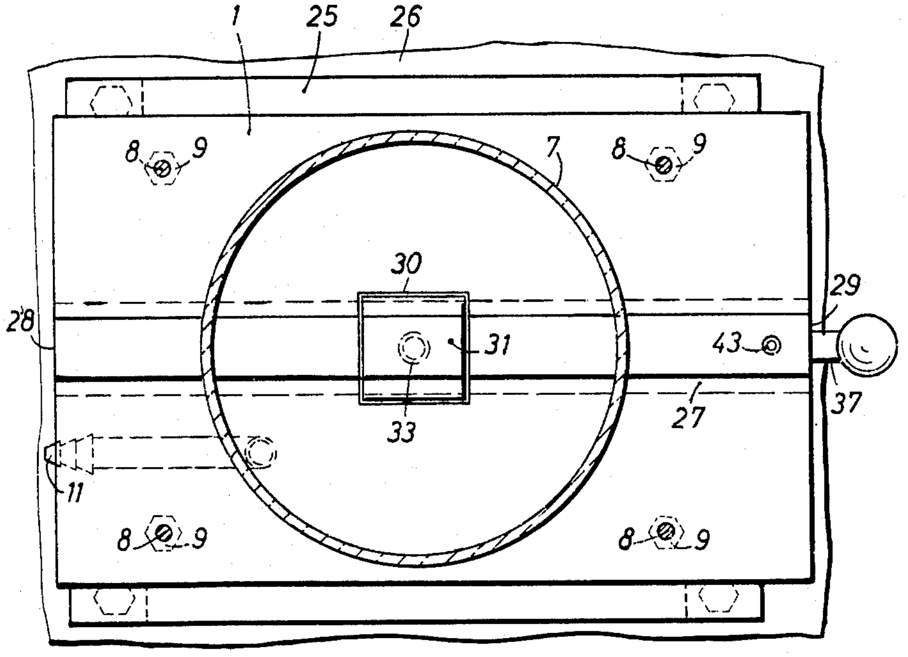
FIG. 2 is a plan view on a horizontal cross-section through the same apparatus taken along the lines II—II of FIG. 1.
Figure 3:
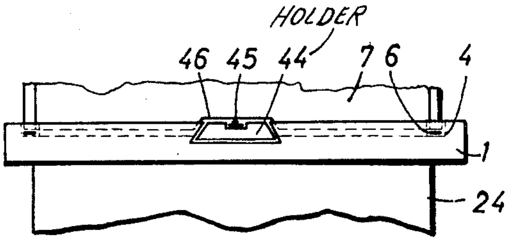
FIG. 3 is a side elevation of part of the apparatus shown in FIG. 1.

In FIGS. 2 to 4, minor details are omitted for the sake of clarity.

FIGS. 5 to 7 show two different side elevations (FIGS. 5 and 6) and a plan view (FIG. 7) of details of carriers in the form of plates introduced into a dovetailed guide of a base plate, by means of which the alloying material and the semiconductor bodies are supplied to a stamp and to an alloying jig.

Figure 8:
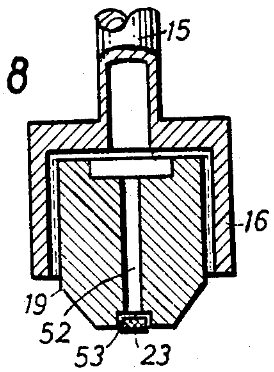
Figure 9:
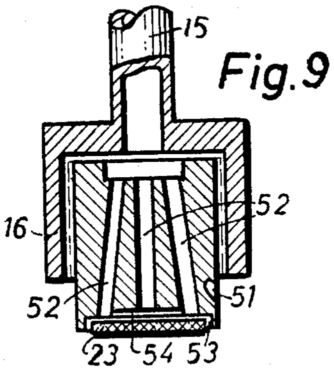

FIGS. 8 and 9 show details of the alloying jig and a threaded sleeve, in which it is attached, in two longitudinal cross-sections.

Figure 10:
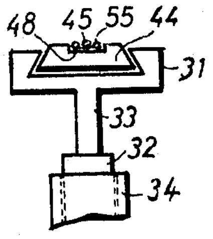

FIG. 10 is a side view of a stamp.

Figure 11:
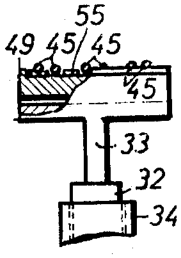

FIG. 11 is another side view, partially in cross-section.

Figures 12, 13, 14:
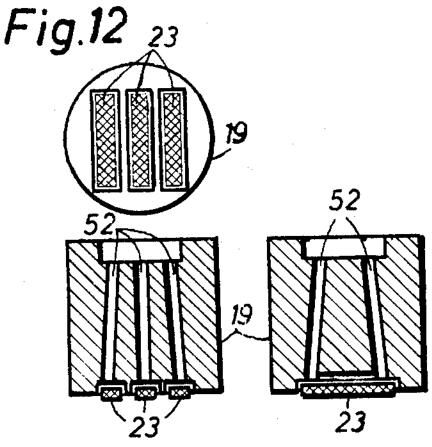

FIGS. 12 to 14 show an alloying jig suitable for the provision of a plurality of semiconductor bodies in plan view (FIG. 12) and in two side elevations of cross-section (FIGS. 13 and 14).

Figure 15:
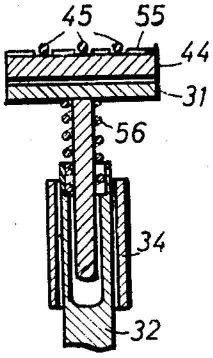

FIG. 15 is a cross-section of a particular embodiment of the stamp.

The apparatus for performing the method according to the invention comprises a base plate 1 and a cover plate 2 (see FIGS. 1 to 4) between which a cylindrical glass tube 7 is held in annular recesses 3 and 4 with the interposition of sealing rings 5 and 6. The base plate 1 and the cover plate 2 are held together by the bolts 8 and the associated nuts 9. The base plate 1, the cover plate 2 and the glass tube 7 enclose a space 10 in which the desired protective gas atmosphere, for example consisting of nitrogen or nitrogen with hydrogen, can be maintained by means of a gas inlet 11 and a gas outlet 12. The cover plate 2 comprises a cap 13 in which a holder is screwed. This holder comprises a tube 15 for connecting a vacuum pump (not shown). At its lower end, the holder comprises a threaded sleeve 16. The connection tube 15 and the threaded sleeve 16 consist of refractory material, for example chrome-nickel. This threaded sleeve is surrounded by the heating member 17 with the heating winding 18. The connection wires of the heating winding are passed out through the cover plate 2, for example by means of leading-in members of known type. These leading-in members are not shown. An alloying jig 19 is screwed in the threaded sleeve 16. This alloying jig 19 consists, for example, of very pure graphite or of steel. Details of their shape are described below. An aperture is provided in the alloying jig 19 in which a thermo element 20 is provided, the connection wires 21 of which lead to the diagrammatically shown measuring instrument 22. The temperature of the alloying jig is measured by means of the thermo-element. The object of the thermo-element may be to control a temperature regulation for the alloying jig 19 in known manner. A semiconductor body 23 is held against the alloying jig by the negative pressure produced by the vacuum pump not shown.

By means of supports 24 the base plate 1 is connected to a pedestal 25 which in turn is screwed to a foundation 26. A straight dovetail guide 27 is provided in the base plate 1 which extends from 28 to 29 throughout the whole base plate. The centre comprises a rectangular recess 30 in which a rectangular stamp 31 is provided movably, the shape of which will be described in detail. This stamp 31 is provided on a rod 32 which is movably passed through an aperture 33 to the base plate 1. The lower end of this rod 32 is thickened and is guided by a sleeve 34. It is locked against rotation about its axis by a stud 35 which is capable of moving in a recess 36 of the sleeve 34. By means of a lever 37 the rod 32 and consequently the stamp 31 can be moved up and down in the direction of the arrows 38. The upwards and downwards motion is limited by the screw 39 in co-operation with the two adjustable stop members 40 and 41.

The dovetail guide 27 is also provided in the stamp 31. The lower stop member 41 is adjusted so that in the case of the stamp 31 being lowered entirely the dovetailed guide in the base plate 1 and that in the stamp 31 are in alignment so that a correspondingly shaped piece of material can be slid from 28 via the stamp 31 to 29 in the dovetail guide 27. A stop member 43 which can be moved downwards against the force of two springs 42 ensures a blocking of the dovetailed guide 27 as will be described in detail below.

Figure 1:
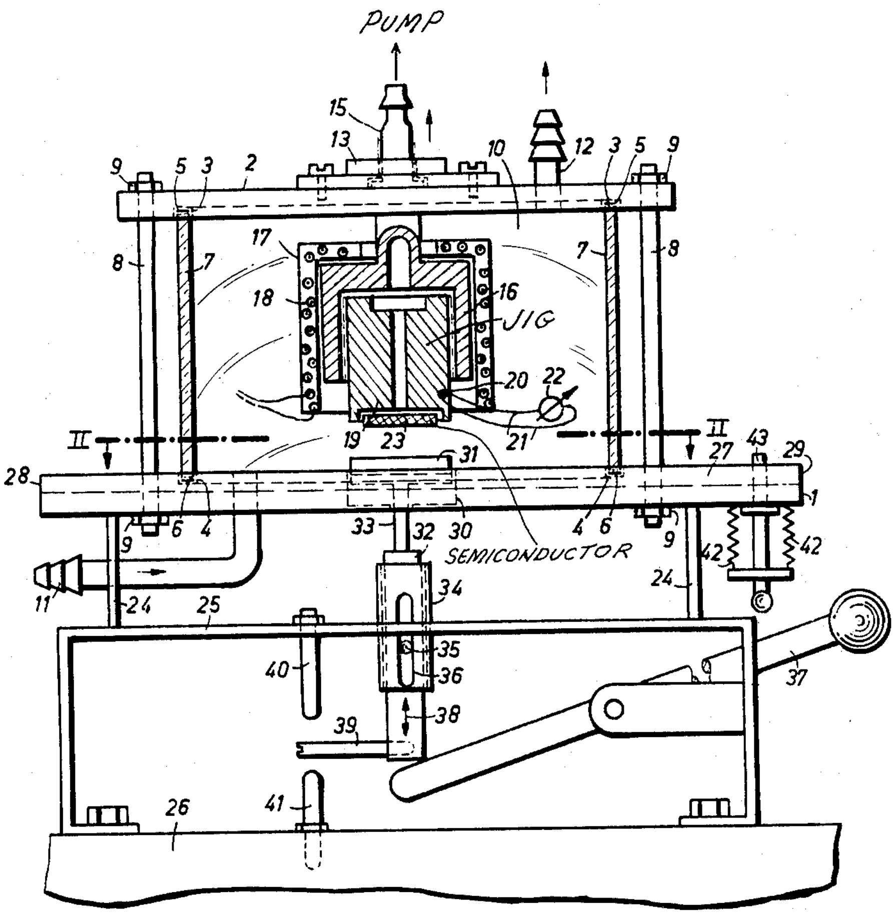
FIG. 1 shows a side view, partially in cross-section, of apparatus for performing the method according to the invention.

In FIG. 3 which shows a partial side elevation of the apparatus shown in FIG. 1, a holder, for carrying electrode material or one or more semiconductor bodies, in the form of a plate 44 is shown on which the electrode material 45 is provided so that it may be seen how these plates can move in the dovetailed guide. The glass tube 7 has a recess 46, so that the plate 44 with the electrode material 45 can be slid below the edge of the glass tube 7. In FIG. 3 the electrode material 45 and the gap between the plates 44 and the glass tube 7 are shown on an exaggerated scale for the sake of clarity. Actually, this gap is so narrow that practically no protective gas can escape to the outside through it from the interior of the apparatus. (The plate 44 is not shown in FIGS. 1, 2 and 4. Details of the plate are shown in FIGS. 5 to 7.)

In the plan view shown in FIG. 4 of the apparatus shown in FIG. 1, various details are not shown for the sake of clarity.

FIGS. 5 to 7 show a side elevation (FIGS. 5 and 6) and a plan view of the plate 44. The inclined faces 47 are adapted to match the shape of the dovetail guide 27. At its upper side the plate 44 comprises a recess 48 in which two rivets 49 are provided. These rivets prevent a semiconductor body (not shown) laid into the recess 48 from being displaced (see below). Their mutual distance corresponds to the length of the semiconductor body and the width of the recess 48 corresponds to the width of the semiconductor body.

The electrode material also may be laid in the recess 48 of the plate 44 by laying a mica plate, the proportions of which correspond to those of the semiconductor body 23, in the recess 48, so that they are retained in the same manner as the semiconductor body by the rivets 49. This mica plate comprises holes in which the electrode material, for example in the form of pellets, may be laid in known manner.

The distance between the stop member 43 and the recess 30 (FIG. 1) is such that it corresponds to a submultiple of the length 50 (FIG. 5) of the plate 44, so that when a number of plates 44 are inserted at 28 (FIG. 1) into the dovetail guide 27 in a manner such that closely engaging one another they touch the abutment stop, exactly one of the plates is located on the stamp 31.

FIGS. 8 and 9 show details of the alloying jig 19 (compare FIG. 1). The perforation 51 serves to receive the thermo-element 20. Three channels 52 connect the interior of the connection tube 15 to a channel 53, the shape of which corresponds to that of the semiconductor body 23. Owing to the negative pressure prevailing in these three channels 52, the semiconductor body 23 is retained in the channel 53 when the vacuum pump is actuated (see above). At their lower ends, the channels 52 are connected by a groove 54 which ensures an equalization of pressure, if required.

FIGS. 10 and 11 show two side views of the stamp 31 with on top a plate 44. The mica plate 55 in the perforations of which the electrode material 45 is provided is located in the recess 48. The thickness of the mica plate and the size of the pellets of electrode material 45 is shown exaggerated. Actually, instead of the three pairs of pellets 45 of electrode material shown a considerable larger amount of such pairs fits on the mica plate. Each time one pellet of the pairs forms, for example, the emitter electrode of a transistor after alloying, the other, for example, the base electrode, so that a plurality of transistors can be manufactured in one operation. (Naturally, after alloying the electrodes the semiconductor body 23 must be broken into pieces, each piece comprising two electrodes.)

FIGS. 12 to 14 show another embodiment of the alloying jig, in which three semiconductor bodies 23 can be retained simultaneously. For such an alloying jig, the plate 44 must be larger so that three semiconductor bodies and three mica plates with electrode material respectively can be provided on it.

FIG. 15 shows an embodiment of a stamp 31 in which it is held on the rod 32 in a resilient manner by a helical spring 56. If this stamp is forced against the alloying jig when actuating the lever 37 (FIG. 1), so that the helical spring 56 is compressed in case of a corresponding adjustment of the stop member 40, the tension of the spring 56 determines the pressure of the electrode material 45 against the semiconductor body 23.

The operation of the device is as follows:

At 28, plates 44 are inserted into the dovetail guide 27 which is filled alternately with a semiconductor body or wafer 23 and a mica plate 55 with electrode material 45. These plates are provided against each other until they touch the stop member 43. Initially the alloying jig 19 is empty, that is to say, no semiconductor body 23 is located in it. Then protective gas is introduced into the device, after which the heating of the alloying jig is switched on until the alloying jig has reached the required alloying temperature for germanium, for example 600 or 700° C. On the stamp 31 exactly one plate 44 is located comprising a semiconductor body 23. Then the vacuum pump is switched on and, by actuating the lever 37 the semiconductor body 23 is introduced into the channel 53 where it is retained by the negative pressure produced by the vacuum pump and very rapidly assumes the temperature of the alloying jig as a result of its comparatively small heat capacity with respect to that of the alloying jig. The stamp is returned to its lower rest position, the stop member 43 is pulled downwards and the plates in the dovetail guide are moved in the direction from 28 to 29; at 29 a plate is removed, the springs 42 pull the stop member 43 into its rest position again and the remaining plates in the dovetail guide are moved until they touch the stop member 43. Now a plate filled with electrode material is located on the stamp 31. By actuating the lever 37, the stamp is moved upwards so that the electrode material is provided on the heated semiconductor body 23 where it alloys. Then the vacuum pump is switched off and the stamp is returned to its lower rest position. Since after switching off the vacuum pump the semiconductor body 23 is no longer retained against the alloying jig 19, it remains, together with the alloyed electrode material 45, in the recess 48 of the plate 44 which is located against the stamp 31 and cools very rapidly. Then new filled plates 44 are introduced at 28 and the row of plates is moved in the direction from 28 to 29 by one length of a plate. Then again a plate with a semiconductor body 23 is located on the stamp 31 and the operation described may be repeated.

Above the dovetail guide on the side facing 29, the recess 46 of the glass tube 7 as shown in FIG. 3 is shaped so that a plate 44 with electrode material and semiconductor body fits through it. Since the semiconductor body 23 is comparatively thin, in practice only very little protective gas flows out through this aperture also in as far as it is not closed substantially by a semiconductor body located in it.

It is clear from the above how at 28 alternately plates 44 filled with electrode material 45 and semiconductor body 23 can be continuously inserted, while at 29 alternately empty plates 44 and plates filled with an alloyed semiconductor body are removed.

In the above description, an embodiment of apparatus according to the invention was described by way of example. However, it is also possible to obtain the sealing of the apertures formed by the dovetail guide and the recesses 46 by the plates 44 themselves. At these plates, gas locks of known construction may be used in addition. The guiding of the plates also may be carried out, for example, in a manner different from a dovetail guide. In addition, the stamp may be heated so that the semiconductor bodies and the electrode material respectively inserted into the alloying jig are preheated. It is also possible to omit a movable stamp and to use a movable alloying jig. In addition the plates 44 may be filled simultaneously with electrode material and semiconductor bodies and in this manner electrode material and semiconductor body may be introduced simultaneously into the alloying jig. As a result of the small heat capacity of the semiconductor body as compared with that of the alloying jig, the semiconductor bodies, after introduction into the alloying jig, very rapidly assume the temperature of the jig. After removal they very rapidly cool again, since the stamp has a temperature which lies far below the alloying temperature. The pressing of the electrode material lasts only a very short time, so that the whole alloying process consumes only a few seconds.

The advantage of the method described consists in a very rapid performance of the alloying of the electrode material of the semiconductor body which is desired for mass production. Besides, the influence of the contaminations present in the protective gas becomes very small. The semiconductor devices manufactured according to the method have a very satisfactory reproducibility from which it follows that the number of rejects owing to faultily alloyed electrodes is very small.

What is claimed is:

1. In the manufacture of a semiconductor device, the method of alloying a small electrode mass to a thin, wafer-like, semiconductor body, comprising the steps of providing in a protective gas atmosphere an alloying jig for holding the semiconductor body and electrode material while they are alloying together at an elevated alloying temperature, said alloying jig having a large heat capacity compared with that of the semiconductor body and electrode, preheating said jig to at least the alloying temperature prior to supplying the semiconductor body and electrode material thereto, thereafter supplying the semiconductor body and electrode material to the preheated jig and holding the body and material in contact with one another and in releasable engagement with the jig until they assume the alloying temperature and alloy together, and thereafter separating the alloyed body and electrode material from the heated alloying jig allowing the former to cool down rapidly.

2. In the manufacture of a semiconductor device, the method of alloying a small electrode mass to a thin, wafer-like, semiconductor body, comprising the steps of providing in a protective gas atmosphere an alloying jig for holding the semiconductor body and electrode material while they are alloying together at an elevated alloying temperature, said alloying jig having a large heat capacity compared with that of the semiconductor body and electrode, preheating said jig to at least the alloying temperature prior to supplying the semiconductor body and electrode material thereto, thereafter supplying the semiconductor body to the preheated jig and holding same in releasable engagement therewith, thereafter applying the electrode material to the semiconductor body while on the alloying jig and holding the body and material in contact with one another until they assume the alloying temperature and alloy together, and thereafter separating the alloyed body and electrode material from the heated alloying jig allowing the former to cool down rapidly.

3. A method as set forth in claim 2 wherein the electrode material is urged with pressure against the surface of the semiconductor body.

4. In the manufacture of a semiconductor device, the method of alloying a small electrode mass to a thin, wafer-like, semiconductor body, comprising the steps of providing an alloying jig for holding the semiconductor body and electrode material while they are alloying together at an elevated alloying temperature, said alloying jig having a large heat capacity compared with that of the semiconductor body and electrode, preheating said jig to at least the alloying temperature prior to supplying the semiconductor body and electrode material thereto, thereafter moving a semiconductor body to the preheated jig and releasably holding it on the jig, thereafter pressing the electrode material against a surface of the semiconductor body while it is on the heated jig until they assume the alloying temperature and alloy together, and thereafter releasing and separating the alloyed body and electrode material from the heated alloying jig allowing the former to cool down rapidly.

5. A method as set forth in claim 4 wherein plural semiconductor bodies and plural masses of electrode material are arranged in carriers in a row in alternating sequence and then moved in a stepwise manner underneath the alloying jig, and in the intervals between movements, a semiconductor body is first transferred to the heated alloying jig and subsequently the electrode material next in row is transferred to the alloying jig and pressed against the semiconductor body, after which the alloyed material and body are returned to the carrier which conveyed the transferred electrode material.

6. In the manufacture of a semiconductor device, the method of alloying a small electrode mass to a thin, wafer-like, semiconductor body, comprising the steps of providing an alloying jig for holding the semiconductor body and electrode material while they are alloying together at an elevated alloying temperature, said alloying jig having a large heat capacity compared with that of the semiconductor body and electrode, preheating said jig to at least the alloying temperature prior to supplying the semiconductor body and electrode material thereto, thereafter suppyling the semiconductor body to the preheated jig and holding same in releasable engagement therewith by reduced pressure, thereafter applying the electrode material to the semiconductor body while the latter is held on the alloying jig and holding the body and material in contact with one another until they assume the alloying temperature and alloy together, and thereafter separating the alloyed body and electrode material from the heated alloying jig allowing the former to cool down rapidly.

References Cited by the Examiner

UNITED STATES PATENTS

| | | | |
|---|---|---|---|
| 104,412 | 6/1870 | Bostwick | 113—106 |
| 1,259,141 | 3/1918 | Schoenman | 113—111 |
| 1,367,018 | 2/1921 | Coffelder | 113—129 |
| 1,864,846 | 6/1932 | Moon | 113—129 |
| 2,840,495 | 6/1958 | Trenting | 148—1.5 |
| 2,910,394 | 10/1959 | Scott | 148—1.5 |
| 2,939,205 | 6/1960 | Sutherland | 148—1.5 |
| 3,135,232 | 6/1964 | Fell | 148—1.5 |

HYLAND BIZOT, *Primary Examiner.*